COMPENSATED REGULATED POWER SUPPLY
Filed June 5, 1963
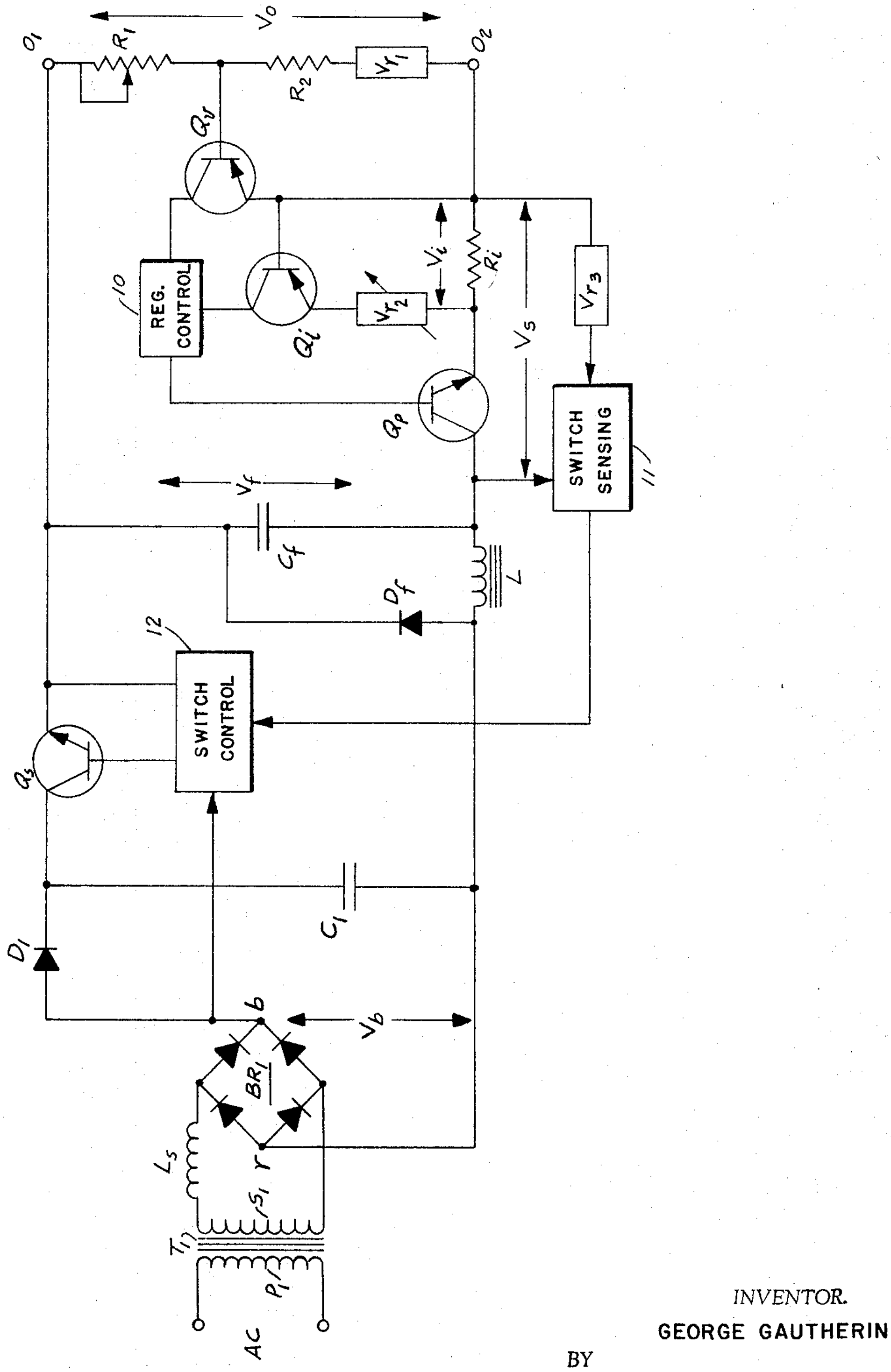
INVENTOR.
GEORGE GAUTHERIN
BY
Morgan, Finnegan, Durham & Pine
ATTORNEYS

United States Patent Office 3,284,692

Patented Nov. 8, 1966

3,284,692

COMPENSATED REGULATED POWER SUPPLY

George Gautherin, Woodside, N.Y., assignor to Lambda Electronics Corporation, Huntington, N.Y., a corporation of New York Filed June 5, 1963, Ser. No. 285,785
7 Claims. (Cl. 321—16)

Switching elements are sometimes employed in regulated D.C. power supplies, taking in many cases the form of a transistor or controlled rectifier which is essentially operated as a bistable device in either its conductive or cut-off state. In many applications large currents are controlled by the switching element. These currents have their source in rectifier systems energized from the line via transformers.

In some cases the switching operations in the regulated supply operate directly on the alternating input or on a rectified but unfiltered product thereof. When switching techniques are thus employed, a problem associated with leakage inductance in the input power transformer arises. When the switching transistor control circuit operates to cut the switching transistor off, the effect of the leakage inductance is to attempt to maintain current flow in the circuit due to the energy stored therein. In effect the voltage drop associated with the leakage inductance reverses polarity, assuming the direction necessary to continue current flow in its previous direction. Unless this action is prevented or controlled, large voltages develop in the circuit and breakdown may result. Controlling this condition is especially vexatious because the leakage inductance of the power transformer is not a lumped or external parameter but is rather integrated with and distributed within the transformer. Any means developed for solving the problem must account for this aspect.

Assuming the means are developed for eliminating the problem associated with leakage inductance, it would be desirable that the resultant energy transfer from this component be usefully employed rather than dissipated such as frequently results in handling stored inductive energy. Moreover, it would be desirable that the adopted solution perform satisfactorily over the wide band of frequencies applicable to general purpose power supplies, e.g., 35 to 500 c.p.s.

It is therefore one object of the invention to eliminate certain undesirable effects resulting from leakage inductance in the power transformer of a regulated D.C. power supply having switching elements therein.

A still further object of the invention is to eliminate such effects over a relatively wide band of input power frequencies.

A still further object of the invention is to convert the energy stored in the leakage inductance into useful output energy for energizing the load.

A still further object of the invention is to eliminate such leakage inductance effects while at the same time providing improvements in transformer efficiency at higher frequencies.

These and other objects and advantages of the invention will be set forth in part hereinafter and in part will be obvious herefrom, or may be learned by practice with the invention, the same being realized and attained by means of the instrumentalities, parts, combinations and improvements pointed out in the appended claims.

In addition to solving certain transformer leakage inductance problems, the solution according to the invention has proved of benefit in connection with the effect of filter chokes at the high end of the input power frequency band. This will be noted more fully hereinafter.

The invention consists in the novel parts, constructions, arrangements, combinations and improvements herein shown and described.

Serving to illustrate an exemplary embodiment of the invention is the sole figure comprising a schematic diagram of a regulated wide band power supply according to the invention.

As seen in the figure, a transformer $T_1$ has its primary $P_1$ adapted to be energized from a source of alternating current. The secondary $S_1$ is connected to a rectifier embodied as a bridge type, $BR_1$. The leakage inductance of $T_1$ is symbolically represented as $L_S$ in series between one side of the secondary $S_1$ and one input terminal of bridge $BR_1$.

Output terminal *b* of the bridge is connected via an asymmetrically conducting element embodied as a solid state diode $D_1$ to one side of a capacitance $C_1$. The other side of $C_1$ is returned to bridge output terminal *r* so that $D_1$ and $C_1$ are connected in serial relation across the bridge output. Capacitance $C_1$, as noted more fully hereinafter, functions with other components in compensating for certain effects of leakage inductance $L_S$.

Connected across $C_1$ is the series combination of a switching element $Q_S$ embodied as a transistor, a filter capacitance $C_f$, and a choke L; flyback diode $D_f$ shunts L and $C_f$. The emitter-collector circuit of $Q_S$ is in series circuit relation with $C_f$ and when current flows through the former, the latter is charged. By controlling the switching intervals of $Q_S$, the voltage $V_f$ across $C_f$ is controlled.

In the illustrated embodiment it is desired to control $V_f$ in relation to the regulated output voltage $V_0$ of the supply to the end that certain other voltages hereinafter described are maintained substantially constant.

One side of $C_f$ is connected to supply output terminal $O_1$ while the other side thereof is connected to output terminal $O_2$ via the series combination of a variable impedance device embodied as the emitter-collector circuit of a transistor $Q_p$, and a load current sensing resistance $R_i$. Across output terminal $O_1$, $O_2$ is the series combination of variable resistance $R_1$, fixed resistance $R_2$ and a source of reference potential $V_{r1}$. To the junction of $R_1$ and $R_2$, and to output terminal $O_2$, is connected a voltage error stage embodied as a transistor $Q_v$ having its base connected to junction $R_1$–$R_2$ and its emitter to $O_2$. The output of stage $Q_v$ is connected via the collector to a regulator control circuit 10 which illustratively may include switching means, an amplifier and driver. The output of the regulator control circuit is connected to the input base circuit of pass transistor $Q_p$. As a result of the foregoing circuit arrangement, the impedance of $Q_p$ is automatically and continuously adjusted to maintain the output voltage $V_0$ constant.

The illustrated embodiment also provides a current regulated mode operable when load current reaches a predetermined magnitude. To this end a current error detector embodied as a transistor stage $Q_i$ is provided. The emitter-base circuit of $Q_i$ is connected across the series combination of resistance $R_i$ and a source of adjustable reference potential $V_{r2}$. The output of $Q_i$, taken illustratively from the collector, is applied to the regulator control circuit. When the load current reaches a predetermined magnitude, the output of $Q_i$ is sufficient to disconnect the voltage error input from stage $Q_v$ and to assume control. When this occurs constant current operation ensues.

It may be recalled that the switching transistor $Q_s$ is controlled to regulate the filter voltage $V_f$ in relation to $V_0$. Preferably, the switch control circuit is so operated as to keep the difference between $V_f$ and $V_0$ at a substantially constant value. To this end, the potential drop $V_s$ across $Q_p$ and $R_i$ is applied along with a reference voltage $V_{r3}$, to a switch sensing circuit 11. The output of the latter is fed to and controls the switch control circuit 12 in such a manner as to maintain the drop $V_s$ at a satisfactorily constant value by controlling the charging of $C_f$ through $Q_s$.

The switch control circuit also receives an input related to line frequency from terminal *b* of the bridge to synchronize the switching control function with line frequency. Diode $D_1$ isolates the synchronizing input from the drop across $C_1$.

At those instants of time when $Q_s$ is switched off, the tendency of leakage inductance $L_s$ is to maintain current through $Q_s$ since switching will frequently occur at the peak value of $V_b$. To eliminate this tendency and related effects, $C_1$ is provided whereby the reversed voltage across $L_s$ causes a current flow through $D_1$ to charge $C_1$. During those intervals when $Q_s$ is conducting, this additional charge in $C_1$ supplies useful energy to the load.

$C_1$ also has the beneficial effect of permitting a single value for choke L over a relatively wide band of frequencies. Without $C_1$, and for a given value of L, the load would have to be decreased proportional to frequency in order to conserve output voltage.

It should be noted that the size of $C_1$ is relatively small compared with a conventional filter capacitance, and may be, for example, $\frac{1}{20}$ the size of the filter. It is sufficiently small that, upon conduction of $Q_s$, the voltage across $C_1$ discharges to the value of $V_b$ in a period short compared with the input half wave period at the low frequency end of the range.

The invention is not limited to the specific mechanisms shown and described, but departures may be made therefrom within the scope of the accompanying claims without departing from the principles of the invention and without sacrificing its chief advantages.

What is claimed is:

1. In a wide band regulated D.C. power supply having a power transformer secondary winding, rectifier means connected to said winding, switching means connected to said rectifier means, an output circuit including filter capacitance means connected to said rectifier and switching means, and control means connected between said output circuit and said switching means for controlling said switching means to thereby regulate the output of the supply, the improvement comprising compensating means for reducing the effects of leakage inductance in said power transformer, said compensating means comprising capacitive means connected to said rectifier means to be charged from the output of said transforming winding, said capacitive means having a value less than the value of said filter capacitance means.

2. Compensating means according to claim 1 including choke means connected to said switching means and wherein said compensating capacitive means includes capacitance operable to compensate for effects of said choke at the high end of said band.

3. Compensating means according to claim 2 in which said switching means comprise a solid state switch separate from said rectifier means, and including diode means connected between said switch and said rectifier means, said capacitive means being connected across the combination of said rectifier means and said diode means.

4. In a wide band regulated A.C. to D.C. power supply having a power transformer adopted for energization by an alternating current source, a rectifier circuit connected to a winding of said power transformer and including a controlled switch, a filter circuit connected to said rectifier circuit for filtering the output thereof, an output circuit connected to said filter circuit, and regulating means interconnecting said rectifier circuit and output circuit for regulating the output of said supply, means for compensating for leakage inductance effects in said power transformer comprising capacitive means connected to receive charge from said winding via said rectifier circuit, said capacitive means having a value less than that required for filtering, such that the discharge thereof during operation of said controlled switch occurs in a time interval not in substantial excess of the period of said alternating current source at the intermediate and low end of said band.

5. Compensating means according to claim 4 in which said capacitive means is substantially smaller than the capacitance of said filter circuit.

6. Compensating means according to claim 4 in which said regulating means include switch control means synchronized with said alternating current source.

7. Compensating means according to claim 6 in which said regulating means include variable impedance means, output voltage control means and output current control means jointly connected to said output circuit, said voltage and current control means being connected to said variable impedance means for providing voltage and current regulation.

References Cited by the Examiner

UNITED STATES PATENTS

| | | |
|---|---|---|
| 3,009,093 | 11/1961 | Seike. |
| 3,125,715 | 3/1964 | Brooks. |
| 3,211,989 | 10/1965 | Mintz et al. |
| 3,213,351 | 10/1965 | Walker. |
| 3,217,232 | 11/1965 | Hamilton. |

OTHER REFERENCES

Electronics, March 9, 1962, McGraw-Hill Pub. Co., New York, pp. 62–64.

JOHN F. COUCH, *Primary Examiner.*

M. L. WACHTELL, *Assistant Examiner.*